(12) United States Patent  
Pfannschmidt

(10) Patent No.: US 9,866,086 B2  
(45) Date of Patent: Jan. 9, 2018

(54) ELECTRICAL MACHINE HAVING A HOUSING OVER A PARTIAL CIRCUMFERENCE

(71) Applicant: SIEMENS AKTIENGESELLSCHAFT, München (DE)

(72) Inventor: Bernd Pfannschmidt, Rosstal (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 265 days.

(21) Appl. No.: 14/784,437

(22) PCT Filed: Mar. 20, 2014

(86) PCT No.: PCT/EP2014/055565  
§ 371 (c)(1),  
(2) Date: Oct. 14, 2015

(87) PCT Pub. No.: WO2014/170085  
PCT Pub. Date: Oct. 23, 2014

(65) Prior Publication Data  
US 2016/0072354 A1    Mar. 10, 2016

(30) Foreign Application Priority Data

Apr. 15, 2013    (EP) .................................... 13163702

(51) Int. Cl.  
*H02K 5/06*    (2006.01)  
*B61C 9/44*    (2006.01)  
(Continued)

(52) U.S. Cl.  
CPC ................. *H02K 5/06* (2013.01); *B61C 9/44* (2013.01); *H02K 7/003* (2013.01); *H02K 1/185* (2013.01); *H02K 7/14* (2013.01)

(58) Field of Classification Search  
CPC . B61C 9/44; H02K 5/06; H02K 7/003; H02K 7/00; H02K 1/185; H02K 7/14; H02K 5/08  
(Continued)

(56) References Cited

U.S. PATENT DOCUMENTS 1,323,662 A    12/1919    Vanderley  
2,323,662 A    10/1942    Jenkins  
(Continued)

FOREIGN PATENT DOCUMENTS

CN    101009452 A    8/2007  
CN    201383724 Y    1/2010  
(Continued)

*Primary Examiner* — Naishadh Desai  
(74) *Attorney, Agent, or Firm* — Henry M. Feiereisen LLC

(57) ABSTRACT

An electric machine has a stator and a rotor. The rotor is arranged on a rotor shaft that can be rotated about an axis of rotation. The stator surrounds the rotor radially on the outside with respect to the axis of rotation. The stator is surrounded radially on the outside by a one-piece housing with respect to the axis of rotation. As viewed around the axis of rotation, the housing extends only over a partial angular range. As viewed around the axis of rotation, a remaining angular range, in which the stator is not surrounded by the housing, thus remains. In end regions located at the ends of the partial angular range, the housing has housing-side form-closure elements, which cause a form closure of the housing with the stator in interaction with stator-side form-closure elements.

8 Claims, 4 Drawing Sheets

(51) Int. Cl.
  *H02K 7/00* (2006.01)
  *H02K 1/18* (2006.01)
  *H02K 7/14* (2006.01)

(58) Field of Classification Search
  USPC .......................................................... 310/89
  See application file for complete search history.

(56) References Cited

U.S. PATENT DOCUMENTS

| | | | |
|---|---|---|---|
| 5,326,235 A * | 7/1994 | Bruhn | B60T 8/4022 |
| | | | 310/89 |
| 7,411,323 B2 | 8/2008 | Pfannschmidt et al. | |
| 7,555,988 B2 | 7/2009 | Pfannschmidt | |
| 7,714,467 B2 | 5/2010 | Pfannschmidt | |
| 7,812,486 B2 | 10/2010 | Pfannschmidt | |
| 9,109,631 B2 | 8/2015 | Pfannschmidt | |
| 2008/0190725 A1 | 8/2008 | Pfannschmidt et al. | |
| 2009/0212649 A1 | 8/2009 | Kingman et al. | |
| 2014/0241912 A1 * | 8/2014 | Braun | F04D 29/628 |
| | | | 417/363 |
| 2015/0130312 A1 * | 5/2015 | Golka | F02N 11/04 |
| | | | 310/89 |

FOREIGN PATENT DOCUMENTS

| | | |
|---|---|---|
| CN | 201590701 U | 9/2010 |
| DE | 860 823 C | 12/1952 |
| DE | 24 32 178 A1 | 1/1976 |
| EP | 1152516 A2 | 11/2001 |
| EP | 2 113 663 A1 | 11/2009 |
| GB | 384 041 A | 10/1931 |
| JP | 2001112198 A | 4/2001 |

* cited by examiner

ELECTRICAL MACHINE HAVING A HOUSING OVER A PARTIAL CIRCUMFERENCE

CROSS-REFERENCES TO RELATED APPLICATIONS

This application is the U.S. National Stage of International Application No. PCT/EP2014/055565, filed Mar. 20, 2014, which designated the United States and has been published as International Publication No. WO 2014/170085 and which claims the priority of European Patent Application, Serial No. 13163702.7, filed Apr. 15, 2013, pursuant to 35 U.S.C. 119(a)-(d).

BACKGROUND OF THE INVENTION

The present invention relates to an electrical machine, wherein the electrical machine has a stator and a rotor, wherein the rotor is disposed on a rotor shaft able to be rotated about an axis of rotation, wherein the stator, in relation to the axis of rotation, surrounds the rotor radially to the outside, wherein the stator, in relation to the axis of rotation, is surrounded radially to the outside by a one-piece housing.

With drives of a nose-suspended design, in particular train drives and in particular often with single-stage integrated transmissions, there is often a conflict between the electrical drive machine on the one hand and the drive wheel axle on the other hand. This applies especially with high traction requirements. In order to solve this problem, it is known in the prior art to cut in the electrical drive accordingly and as a result to create space for the drive wheel axle. On account of the cut, it is however not possible to embody the engine housing as a closed annular housing. Therefore in the prior art the drive motor is generally embodied as a welded construction with pressure plates and train battens. A welded construction of this type is costly. Moreover, in this embodiment a number of successive processing procedures are required, which cannot be parallelized.

It is alternatively naturally possible to arrange the drive wheel axle accordingly remote from the drive. This in principle possible embodiment nevertheless requires considerable space, which is often not available. Moreover, the distance has an influence on the design of the transmission. An enlarged distance can result for instance in further gears having to be introduced.

It is moreover naturally possible to configure the drive to be correspondingly smaller. This nevertheless results in the performance of the drive, in particular the maximum possible torque, the maximum possible continuous output and the maximum possible brief overload output, being reduced accordingly.

SUMMARY OF THE INVENTION

The present invention is based on the object to create an electrical machine, which is designed in a structurally simple manner, can be arranged in a space-saving manner relative to a shaft which runs in parallel to the axis of rotation and consequently has a high performance.

The object is achieved in accordance with the invention by an electrical machine which is configured such that
the electrical machine has a stator and a rotor,
the rotor is disposed on a rotor shaft able to be rotated about an axis of rotation,
the stator, in relation to the axis of rotation, surrounds the rotor (2) radially to the outside,
the stator, in relation to the axis of rotation, is surrounded radially to the outside by a one-piece housing (6),
viewed around the axis of rotation, the housing extends over just one part angular area, so that, viewed around the axis of rotation, a remaining angular area in which the stator is not surrounded by the housing remains, and
the housing has housing-side form-fit elements in end areas located at the ends of the part angular range, which cause a form-fit of the housing with the stator in interaction with stator-side form-fit elements.

Advantageous embodiments of the electrical machine form the subject matter of the dependent claims.

The housing can in particular be a casting.

The stator, with respect to the axis of rotation, generally has an outer wall radially on the outside, which, in the part angular area has a cylindrically embodied section, which defines a cylinder radius. In a preferred embodiment of the present invention, the stator, in the remaining angular area, has a recess which extends in parallel to the axis of rotation. This enables a distance of the outer wall of the stator in the region of the recess to be smaller than the cylinder radius.

The housing can be connected to the stator in principle in any manner. The housing is preferably shrunk onto the stator.

In a particularly preferred embodiment of the inventive electrical machine, the housing has recesses in the end regions, which, viewed in a plane orthogonal to the axis of rotation, extend in a direction of an angle halving of the remaining angular area. By means of this embodiment, adapters and holding elements, which are meaningful within the scope of producing the electrical machine, can be connected to the housing in a simple manner.

The housing often has an essentially rectangular outer contour viewed in a plane orthogonal to the axis of rotation. In the case of an embodiment of this type, the end regions preferably lie within the same side of the rectangular outer contour.

The electrical machine often acts on a drive shaft by way of a transmission, wherein the drive shaft has a shaft axis which runs in parallel to the axis of rotation. In this case, the drive shaft is preferably arranged in the remaining angular area, viewed from the axis of rotation, and penetrates radially between the end regions of the housing, with respect to the axis of rotation.

The stator-side form-fit elements and the housing-side form-fit elements can be embodied as required. The stator-side form-fit elements are preferably embodied as projections, over which the housing-side form-fit elements grip.

BRIEF DESCRIPTION OF THE DRAWING

The afore-described properties, features and advantages of this invention and the manner in which they are achieved will become clearer and more understandable in conjunction with the following description of the exemplary embodiments, which are explained in more detail in conjunction with the drawings, in which, shown in a schematic representation.

DETAILED DESCRIPTION OF PREFERRED EMBODIMENTS

Figure 1:
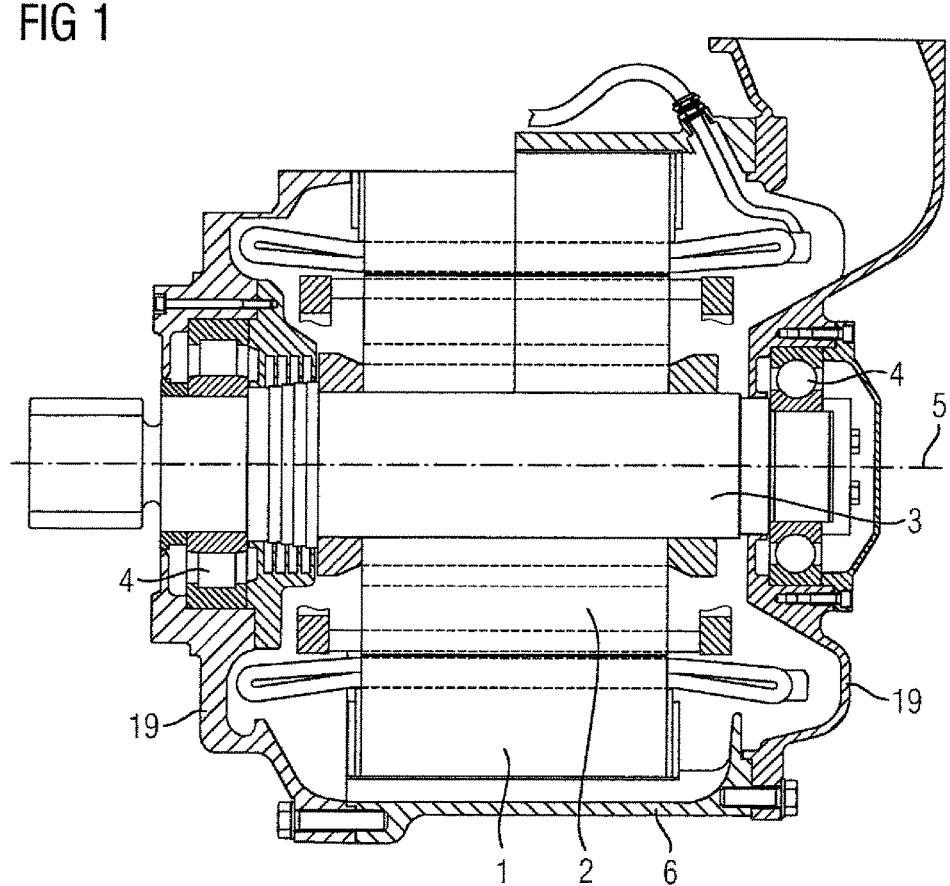
FIG. 1 shows an electrical machine in the longitudinal section.
Figure 2:
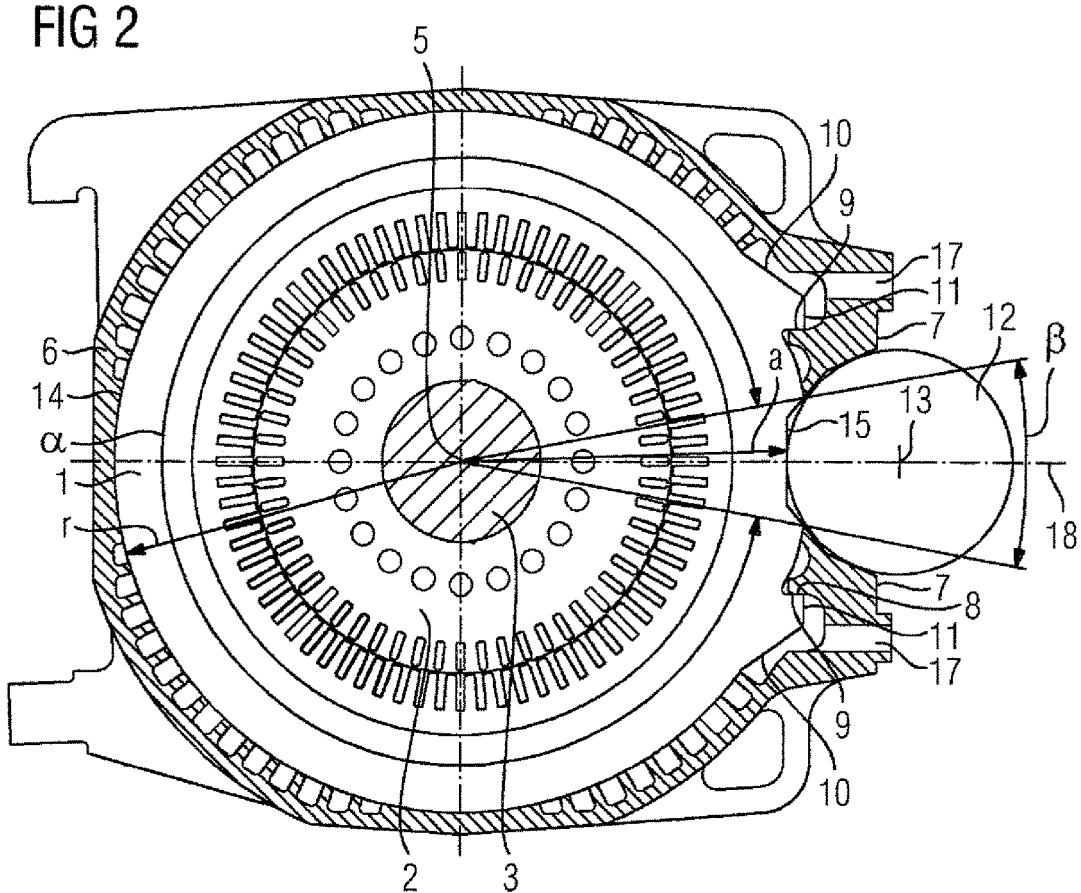
FIG. 2 shows the electrical machine in FIG. 1 in the cross-section.
Figure 3:
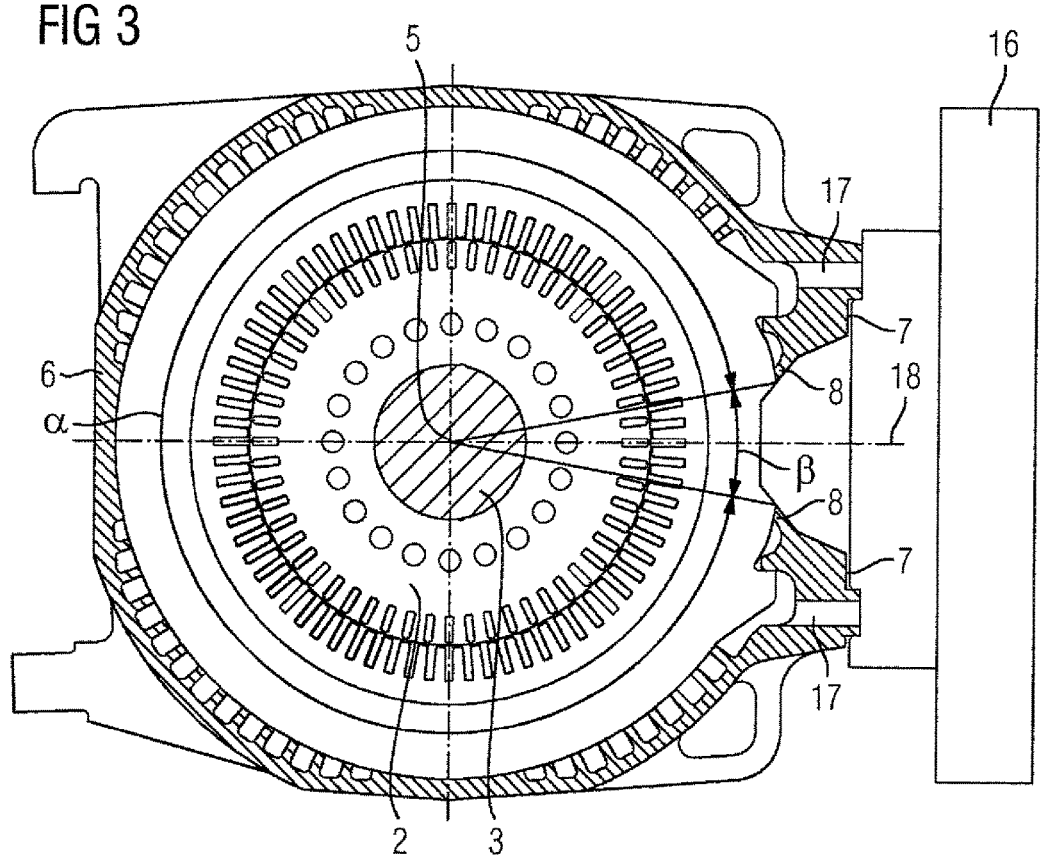
FIG. 3 shows a housing of the electrical machine in FIG. 1 with an adapter.
Figure 4:
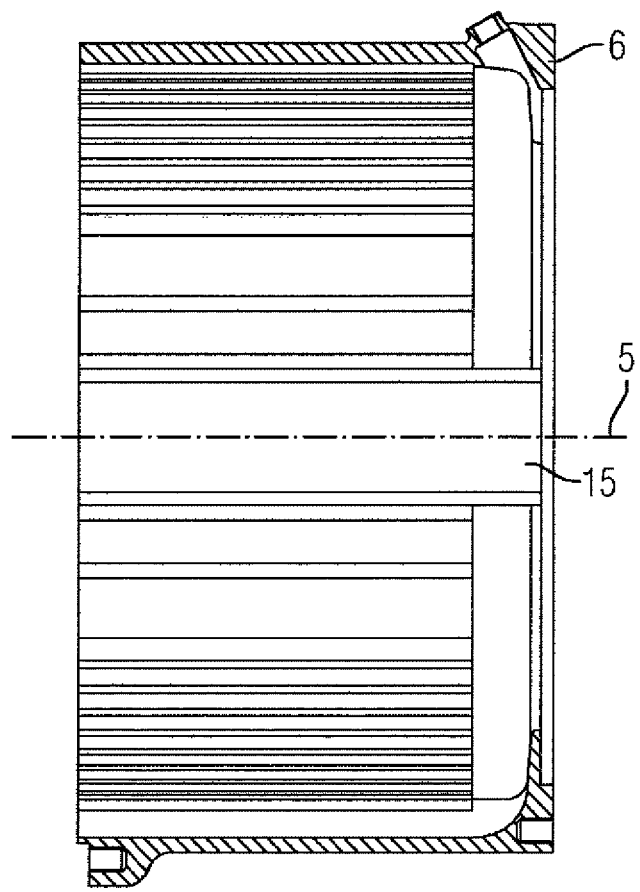
FIG. 4 shows a side view of the housing of the electrical machine in FIG. 1 in a cut-out.

FIGS. 1 to 4 show different aspects of one and the same electrical machine. They are therefore explained together below.

According to the FIG, an electrical machine has a stator 1 and a rotor 2. The rotor 2 is arranged on a rotor shaft 3 in a torque-proof manner. For instance, the rotor 2 can be shrunk onto the rotor shaft 3. The rotor shaft 3 is mounted in bearings 4 and can as a result be rotated about an axis of rotation 5. The bearings 4 can be embodied as required as ball bearings, as roller bearings, as friction bearings, as magnetic bearings etc.

Provided the terms "axial", "radial" and "tangential" are used below, they are always related to the axis of rotation 5. "Axial" is a direction parallel to the axis of rotation 5. "Radial" is a direction orthogonal to the axis of rotation 5 toward the axis of rotation 5 or away therefrom. "Tangential" is a direction which is orthogonal both toward the axial direction and also toward the radial direction. Tangential is therefore a direction which is directed at a constant radial distance and in a constant axial position in circular manner about the axis of rotation 5.

Within the scope of the present invention, this depends decisively on the mechanical-constructive design of the electrical machine. The electrical design of the stator 1 and the rotor 2 is by contrast of less importance within the scope of the present invention. The electrical design of the stator 1 and the rotor 2 are therefore not explained in more detail below.

The stator 1 surrounds the rotor 2 radially to the outside. The electrical machine is therefore embodied as an internal rotor. The stator 1 is in turn surrounded radially to the outside by a housing 6. The housing 6 is embodied in one piece. It can be a casting for instance. The housing 6 extends in a tangential direction only over a part angular area α. A remaining angular area β thus remains in the tangential direction, in which the stator 1 is not surrounded by the housing 6. The part angular area α and the remaining angular area β are complementary to one another. They therefore extend to 360°. Moreover, the remaining angular area β is generally relatively small. In most instances it amounts to a maximum of 30°, for instance approx. 15° to approx. 25°. According to the exemplary embodiment, it lies at approx. 20°.

The housing 6 has housing-side form-fit elements 8 in end regions 7, which are placed at the ends of the part angular area α. The housing-side form-fit elements 8, in interaction with stator-side form-fit elements 9, bring about a form-fit of the housing 6 with the stator 1. For instance, the stator-side form-fit elements 9 can be embodied as projections in accordance with the representation in FIGS. 2 and 3, over which housing-side form-fit elements 8 grip. In this case, the stator-side form-fit elements 9 preferably further have slanted planes 10. They can but do not need to have additional inclinations 11.

The housing 6 can be connected in principle in any manner to the stator 1. For instance, it can be shrunk onto the stator 1.

The inventive electrical machine can in principle be used universally. In many cases, it is used as a nose bearing drive in rail-bound vehicles. In particular, in the case of the use as a nose bearing drive, in principle however also in other uses, the electrical machine can act on a drive shaft 12 by way of a transmission. The drive shaft 12 often has a shaft axis 13 in such cases, which runs in parallel to the axis of rotation 5. Viewed from the axis of rotation 5, the drive shaft 12 in such cases is arranged in the remaining angular area β. Moreover, the drive shaft 12 penetrates between the end regions 7 of the housing 6 in the radial direction.

The stator 1 has an outer wall 14 radially to the outside. The outer wall 14 has a section in the part angular area α, which defines a cylinder radius r. In most cases, the outer wall 14 of the stator 1 has the cylinder radius r within the part angular area α with the exception of the end regions 7. In a particularly preferred embodiment of the inventive electrical machine, the stator 1 has a recess 15 in the remaining angular area β. The recess 15 extends, see FIG. 4, in parallel to the axis of rotation 5. It is as a result possible for a distance a of the outer wall 14 of the stator 1 to be smaller than the cylinder radius in the region of the recess 15. It is in this case possible in particular for the drive shaft 12 not only to penetrate between the end regions 7 of the housing 6 in the radial direction, but also into the recess 15. A minimal distance of the drive shaft 12 from the axis of rotation 5 can therefore be smaller than the cylinder radius r in the region of the recess 15.

In accordance with the invention, the housing 6, as described above, is embodied not to be entirely annular but instead to be interrupted in the remaining angular area β. Within the scope of the production process of the electrical machine, it is (temporarily) nevertheless necessary to make a closed structure available. This is achieved in that adapters 16 (see FIG. 3) are connected to the end regions 7 of the housing 6 during these times. In order to enable such a connection of an adapter 16 with the housing 6, the housing 6 has recesses 17 in the end regions 7. The recesses 17 extend according to FIGS. 2 and 3 viewed in a plane orthogonal to the axis of rotation 5 in the direction of an angle halving 18 of the remaining angular area β. Pin-type projections which are arranged radially to the outside on the adapter 16 can be inserted into the recesses 17 for instance. Alternatively, the adapter 16 can have tapped bores, into which threaded bolts can be inserted, which are passed through the recesses 17 from radially inside. All other embodiments are possible. For instance, recesses 17 can be provided with threads into which screws are rotated.

The housing 6 can have an outer contour, which is essentially round, viewed in a plane orthogonal to the axis of rotation 5. In many cases, the housing 6 nevertheless has an outer contour, which, viewed in a plane orthogonal to the axis of rotation 5, is essentially rectangular, in most instances even square. In this case, the end regions 7 preferably lie within the same side of the rectangular outer contour.

The inventive electrical machine has many advantages. A compact and powerful electrical machine is produced for instance. Moreover, there is additional safeguarding against rotation of the stator 1 in respect of the housing 6 on account of the form-fit connection of the housing 6 with the stator. Moreover, the form-fit secures the shrink fit between the housing 6 and the stator 1. Moreover, the housing 6 can receive bearing shields 19 (see FIG. 1). One of the bearing shields 19 can even be connected in one piece with the housing 6. Finally, a housing construction is formed by the inventively embodied electrical machine, which is largely closed and only open in the remaining angular area β.

Although the invention was illustrated and described in more detail by the preferred exemplary embodiment, the invention is not restricted by the disclosed examples and other variations can be derived herefrom by the person skilled in the art without departing from the scope of protection of the invention.

What is claimed is:

1. An electrical machine, comprising:
   a rotor disposed on a rotor shaft for rotation about an axis of rotation;
   a stator, in relation to the axis of rotation, surrounding the rotor radially to the outside, and having form-fit elements; and
   a one-piece housing radially surrounding the stator in relation to the axis of rotation to the outside, said housing sized to extend only over a part angular area, viewed about the axis of rotation, so as to leave a remaining angular area in which the stator is not surrounded by the housing, said housing having form-fit elements in end regions at ends of the part angular area, said form-fit elements of the housing interacting with the form-fit elements of the stator to establish a form-fit between the housing and the stator.

2. The electrical machine of claim 1, wherein the housing is a casting.

3. The electrical machine of claim 1, wherein the stator has an outer wall having a cylindrical configuration in the part angular area to define a cylinder radius, said stator having in the remaining angular area a recess extending in parallel relation to the axis of rotation, said outer wall being distanced from the axis of rotation in an area of the recess by a distance which is smaller than the cylinder radius.

4. The electrical machine of claim 1, wherein the housing is shrunk onto the stator.

5. The electrical machine of claim 1, wherein the housing has in the end regions recesses which, viewed in a plane orthogonal to the axis of rotation, extend in a direction of an angle halving of the remaining angular area.

6. The electrical machine of claim 1, wherein the housing, viewed in a plane orthogonal to the axis of rotation, has an essentially rectangular outer contour, said end regions of the housing lying inside a same side of the rectangular outer contour.

7. The electrical machine of claim 1, constructed to act via a transmission on a drive shaft having a shaft axis running in parallel relation to the axis of rotation, with the drive shaft, viewed outwards from the axis of rotation, being disposed in the remaining angular area and, in relation to the axis of rotation, penetrating radially between the end regions of the housing.

8. The electrical machine of claim 1, wherein the form-fit elements of the stator are formed as projections, said form-fit elements of the housing gripping over the projections.

* * * * *